(12) United States Patent
Tazume

(10) Patent No.: US 12,536,490 B2
(45) Date of Patent: Jan. 27, 2026

(54) INFORMATION PROCESSING DEVICE, CONTENT PROVIDING METHOD, AND NON-TRANSITORY COMPUTER READABLE MEMORY

(71) Applicant: RAKUTEN GROUP, INC., Tokyo (JP)

(72) Inventor: Toshiaki Tazume, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 51 days.

(21) Appl. No.: 17/988,460

(22) Filed: Nov. 16, 2022

(65) Prior Publication Data

US 2023/0196263 A1    Jun. 22, 2023

(30) Foreign Application Priority Data

Dec. 21, 2021   (JP) ................................ 2021-206841

(51) Int. Cl.
| | | |
|---|---|---|
| *G06Q 30/02* | (2023.01) | |
| *G06Q 10/0833* | (2023.01) | |
| *G06Q 10/0836* | (2023.01) | |
| *G06Q 30/0235* | (2023.01) | |

(52) U.S. Cl.
CPC ..... *G06Q 10/0833* (2013.01); *G06Q 10/0836* (2013.01); *G06Q 30/0235* (2013.01)

(58) Field of Classification Search
None
See application file for complete search history.

(56) References Cited

U.S. PATENT DOCUMENTS

| | | | | |
|---|---|---|---|---|
| 11,396,273 | B2* | 7/2022 | Tazume | .................. B60R 25/20 |
| 2014/0279668 | A1* | 9/2014 | Lievens | ............. G06Q 10/0833 |
| | | | | 705/340 |
| 2015/0161667 | A1* | 6/2015 | Stevens | ................ G06Q 10/083 |
| | | | | 705/14.58 |
| 2016/0025549 | A1* | 1/2016 | Motoyama | ........... G06Q 20/208 |
| | | | | 177/1 |
| 2016/0216106 | A1* | 7/2016 | Motoyama | .............. G07F 17/13 |
| 2016/0292709 | A1* | 10/2016 | Lindbo | .............. G06Q 30/0234 |
| 2016/0320773 | A1* | 11/2016 | Skaaksrud | ............ H04W 24/10 |
| 2017/0109696 | A1* | 4/2017 | Serjeantson | ....... G06Q 30/0217 |
| 2019/0041852 | A1* | 2/2019 | Schubert | ............ G06Q 10/0836 |
| 2020/0327494 | A1* | 10/2020 | Qiu | ...................... G05D 1/0088 |

(Continued)

FOREIGN PATENT DOCUMENTS

| | | |
|---|---|---|
| JP | 2020-67764 A | 4/2020 |
| JP | 2020067764 A * | 4/2020 |

(Continued)

OTHER PUBLICATIONS

Written English translation of Publication No. JP 2020067764 A from STIC services of the USPTO. (Year: 2020).*

*Primary Examiner* — Mathew Syrowik
(74) *Attorney, Agent, or Firm* — Sughrue Mion, PLLC

(57) ABSTRACT

The information processing server 2 communicates with the user terminal 3 of the recipient of the article delivered by the delivery machine 1, specifies content that is content according to the delivery waiting time until the delivery machine 1 arrives at the delivery destination of the article and that can be output on the user terminal 3 during the delivery waiting time, and provides the user terminal 3 during the specified content to delivery waiting time.

9 Claims, 10 Drawing Sheets

(56) References Cited

U.S. PATENT DOCUMENTS

| | | | |
|---|---|---|---|
| 2020/0410442 A1* | 12/2020 | Shapira | G06N 20/00 |
| 2021/0342777 A1* | 11/2021 | Rasmus | G06Q 10/08345 |
| 2021/0370869 A1* | 12/2021 | Tazume | B60R 25/20 |
| 2022/0198355 A1* | 6/2022 | Menachem | G06Q 30/0284 |
| 2023/0347820 A1* | 11/2023 | Tazume | B60Q 5/005 |
| 2024/0278679 A1* | 8/2024 | Song | B60L 53/80 |

FOREIGN PATENT DOCUMENTS

| | | |
|---|---|---|
| WO | 2019/049492 A1 | 3/2019 |
| WO | WO-2023191218 A1 * | 10/2023 |

* cited by examiner

FIG. 5

CORRESPONDENCE RELATIONSHIP BETWEEN DELIVERY WAITING TIME AND CONTENT TYPE

| DELIVERY WAITING TIME | CONTENT TYPE |
|---|---|
| LESS THAN 20 MINUTES | ELECTRONIC BOOK – MAGAZINE |
| 20 MINUTES OR MORE AND LESS THAN 40 MINUTES | ELECTRONIC BOOK – COMIC |
| 40 MINUTES OR MORE AND LESS THAN 60 MINUTES | ELECTRONIC BOOK – BOOK or NOVEL |
| 60 MINUTES OR MORE | MOVING IMAGE |

INFORMATION PROCESSING DEVICE, CONTENT PROVIDING METHOD, AND NON-TRANSITORY COMPUTER READABLE MEMORY

CROSS REFERENCE TO RELATED APPLICATION

This application claims priority from Japanese Patent Application No. 2021-206841 which was filed on Dec. 21, 2021, the disclosure of which is herein incorporated by reference in its entirety.

TECHNICAL FIELD

One or more embodiments of the present invention relates to a technical field of a system or the like that efficiently delivers an article to a delivery destination using a delivery machine.

Conventionally, as a technique for improving efficiency of a visit service (delivery service), for example, WO 2019/049492 A discloses an information processing system that predicts presence/absence of a user at a visit destination (delivery destination) on the basis of sensing data acquired by a sensor included in an information processing terminal arranged on a site of the visit destination, and determines a visit route that enables visiting of all visit destinations in a time zone in which the user can receive a visit on the basis of the prediction.

However, even if the user who is the recipient of an article is at home, there is a case where the user does not notice or is late to notice a notification that the delivery machine has arrived, due to other business such as housework even though the user has been notified. In such a case, there is a problem in that the delivery efficiency decreases if it takes time to receive the article and the waiting time of the delivery machine becomes unnecessarily long, or redelivery occurs.

Therefore, one or more embodiments of the present invention are to providing an information processing device, a content providing method, and a non-transitory computer readable memory, which are capable of suppressing a decrease in delivery efficiency of an article.

SUMMARY

In response to the above issue, an information processing device is configured to communicate with a terminal of a recipient of an article delivered by a delivery machine. The information processing device includes: at least one memory configured to store program code; and at least one processor configured to access the program code and operate as instructed by the program code. The program code includes: specifying code configured to cause the at least one processor to specify content according to a delivery waiting time until the delivery machine arrives at a delivery destination of the article, the content being outputtable on the terminal during the delivery waiting time; and providing code configured to cause the at least one processor to provide the specified content to the terminal during the delivery waiting time.

The specifying code may cause the at least one processor to specify the content having a size, a type, or a reproduction time according to the delivery waiting time.

The providing code may cause the at least one processor to provide the specified content to the terminal when a delivery status of the article is delivery in progress.

The providing code may cause the at least one processor to start streaming distribution of the specified content to the terminal during the delivery waiting time, and stop the streaming distribution in accordance with a time at which the delivery machine arrives at the delivery destination.

The providing code may cause the at least one processor to transmit, to the terminal, control data for stopping the output of the specified content in accordance with a time at which the delivery machine arrives at the delivery destination.

The providing code may cause the at least one processor to transmit, to the terminal, control data for stopping the output in accordance with a time at which the delivery machine arrives at the delivery destination, together with the specified content.

The providing code may cause the at least one processor to provide, to the terminal, arrival notification information that is output on the terminal in accordance with a time at which the delivery machine arrives at the delivery destination, the arrival notification information being output so as to overlap with the output of the specified content.

The arrival notification information may include information indicating that a benefit is granted to the recipient in a case where a time from arrival of the delivery machine to receipt of the article by the recipient is shorter than a threshold.

The program code may further include presenting code configured to cause the at least one processor to present a recipient of the article with a delivery route and a current position of the delivery machine with a delivery status of the article being delivery in progress.

The program code may further include: first determining code configured to cause the at least one processor to determine whether or not a time from arrival of the delivery machine to receipt of the article by the recipient is a threshold or less; and granting code configured to cause the at least one processor to grant a benefit to the recipient in a case where it is determined that the time is the threshold or less.

The program code may further include a second determining code configured to cause the at least one processor to determine whether or not the specified content is being output on the terminal. In a case where it is determined that the specified content is being output on the terminal, the granting code may cause the at least one processor to grant the recipient a benefit of higher value than in a case where the specified content is not being output on the terminal.

The benefit may be an authority to permit output of the specified content after the output of the specified content is stopped.

The benefit may be a discount coupon usable at a time of purchase of the specified content after output of the specified content is stopped.

The specified content may be game content that is playable by the recipient on the terminal.

The specified content may be moving image content that is viewable by the recipient on the terminal.

A content providing method executed by one or more computers, includes: communicating with a terminal of a recipient of an article delivered by a delivery machine; specifying content according to a delivery waiting time until the delivery machine arrives at a delivery destination of the article, the content being outputtable on the terminal during the delivery waiting time; and providing the specified content to the terminal during the delivery waiting time.

A non-transitory computer readable memory has stored thereon a program configured to cause a computer included in a terminal of a recipient of an article to output content on the terminal during a delivery waiting time until a delivery machine that delivers the article arrives at a delivery destination, and to stop the output in accordance with a time when the delivery machine arrives at the delivery destination.

BRIEF DESCRIPTION OF THE DRAWINGS

FIG. 5 is a diagram illustrating an example of a table that defines a correspondence relationship between a delivery waiting time and a content type.

DETAILED DESCRIPTION

Hereinafter, one or more embodiments of the present invention will be described with reference to the drawings. Incidentally, in the following embodiments, the present invention is applied to a delivery system.

[1. Configuration of Delivery System S]

Figure 1:
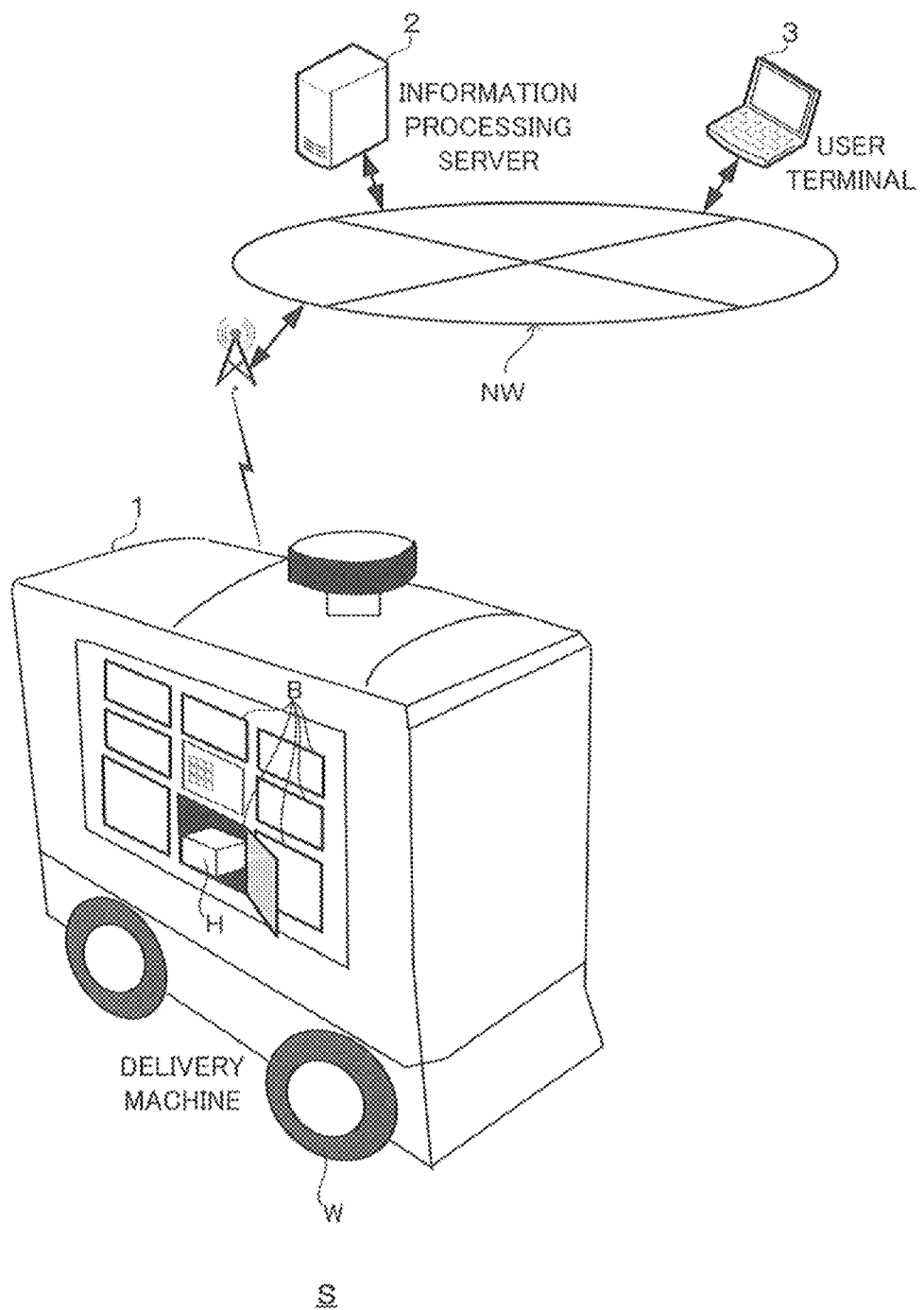
FIG. 1 is a diagram illustrating a schematic configuration example of a delivery system S.

First, a configuration of a delivery system S according to an embodiment of the present invention will be described with reference to FIG. 1. FIG. 1 is a diagram illustrating a schematic configuration example of the delivery system S. As illustrated in FIG. 1, the delivery system S includes a delivery machine 1, an information processing server 2 (an example of an information processing device), and a user terminal 3. Each of the delivery machine 1, the information processing server 2, and the user terminal 3 can be connected to a communication network NW. The communication network NW includes, for example, the Internet, a mobile communication network, a radio base station thereof, and the like. Incidentally, the user terminal 3 exists for each user.

The delivery machine 1 illustrated in FIG. 1 is a UGV (Unmanned Ground Vehicle) having a plurality of wheels and capable of autonomously traveling on the ground in an unmanned manner. However, the delivery machine 1 may be a robot (for example, a biped walking robot) or the like having no wheel. The information processing server 2 is a server for managing a delivery status of an article delivered by the delivery machine 1 and providing information and content related to the delivery of the article to the user terminal 3. The user terminal 3 is a terminal used by a recipient (user) of the article. The content provided to the user terminal 3 is content according to a delivery waiting time (that is, the wait time by the recipient) until the delivery machine 1 arrives at a delivery destination of the article, and is content that can be output (for example, display-output or audio-output) by the user terminal 3 during the delivery waiting time.

The article loaded on the delivery machine 1 as a cargo (package) is, for example, an ordered article (for example, an item or a home delivery article) ordered at an EC (Electronic commerce) site, a home delivery site, or the like. The item may be, for example, a product, a merchandise, or a commodity. The article is transported from a delivery base to a delivery destination (distribution destination) designated by an order by a delivery requester (for example, an orderer of an item). The delivery base is a place where the article is loaded into the delivery machine 1. The delivery destination of the article is, for example, a residence where the recipient of the article lives, an office where the recipient of the article works, or the like, and can also be referred to as a point (receiving point) where an entrance (for example, the front door) of the residence or the office is located. The receiving point is a standby point where the delivery machine 1 waits. Incidentally, the delivery destination and the receiving point of the article may be separated from each other. For example, in a case where the delivery destination is a detached house, the vicinity of a gate at the boundary between a road and the site where the house is built is the receiving point. Moreover, in a case where the delivery destination is a room in a multi-story building such as an apartment building (for example, a high-rise apartment) or an office building, the vicinity of the entrance (common space) on the first floor of the building is the receiving point.

[1-1. Configuration and Function of Delivery Machine 1]

Figure 2:
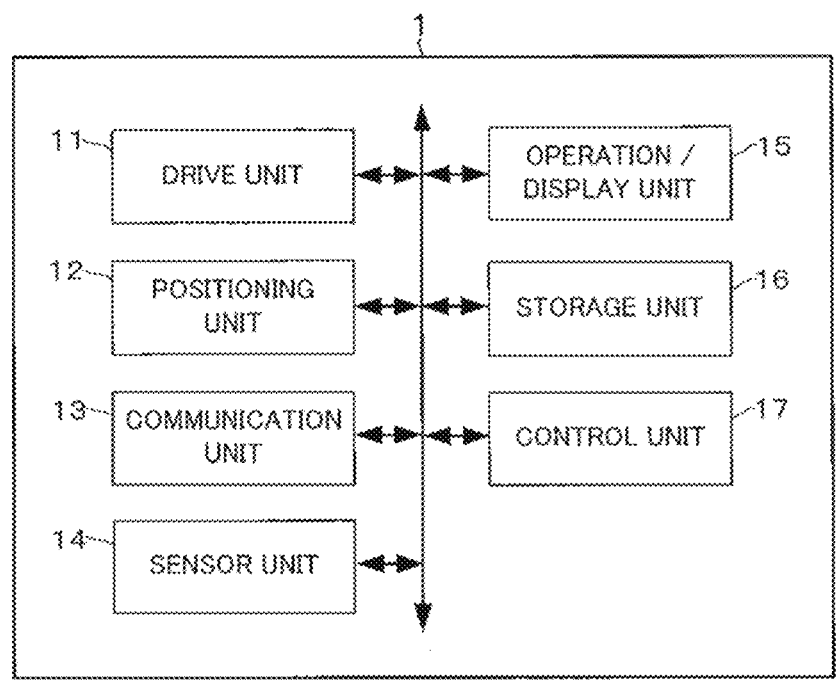
FIG. 2 is a diagram illustrating a schematic configuration example of a delivery machine 1.

Next, a configuration and a function of the delivery machine 1 will be described with reference to FIG. 2. FIG. 2 is a diagram illustrating a schematic configuration example of the delivery machine 1. As illustrated in FIG. 2, the delivery machine 1 includes a drive unit 11, a positioning unit 12, a communication unit 13, a sensor unit 14, an operation/display unit 15, a storage unit 16, a control unit 17, and the like. Furthermore, the delivery machine 1 includes a battery (not illustrated) that supplies power to each unit in the delivery machine 1, wheels W, storing chambers B for storing articles that are loaded, and the like. In the example of FIG. 1, a plurality of the storing chambers B are provided, and the opening/closing door of the storing chamber B at the lowermost stage at the center is opened, and a storage box H storing articles can be taken out (picked up).

The drive unit 11 includes a motor, a rotation shaft, and the like. The drive unit 11 rotates a plurality of the wheels W by the motor, the rotation shaft, and the like that are driven in accordance with a control signal output from the control unit 17. The positioning unit 12 includes a radio wave receiver and the like. The positioning unit 12 receives, for example, radio waves transmitted from GNSS (Global Navigation Satellite System) satellites by a radio receiver, and detects the current position (latitude and longitude) of the delivery machine 1 on the basis of the radio waves. Incidentally, the current position of the delivery machine 1 may be specified by SLAM (Simultaneous Localization and Mapping) processing in addition to radio waves transmitted from the GNSS satellites. The current position of the delivery machine 1 may be corrected on the basis of an image captured by a camera of the sensor unit 14. The position information indicating the current position detected by the positioning unit 12 is output to the control unit 17.

The communication unit 13 controls communication performed via the communication network NW. Moreover, the communication unit 13 may have a short-range wireless communication function such as Bluetooth (registered trademark) and perform short-range wireless communication with the user terminal 3. The sensor unit 14 includes an optical sensor such as a camera. For example, the optical sensor continuously senses (for example, images) a real space within an area that falls within the angle of view of the camera. Sensing information (for example, image data) obtained by sensing with the sensor unit 14 is output to the control unit 17. The operation/display unit 15 includes a display (touch panel) having an input function of receiving an operation of the recipient and a display function of displaying information. Moreover, the storage unit 16 includes a nonvolatile memory or the like, and stores various programs and data. The storage unit 16 stores a machine ID of the delivery machine 1. The machine ID is identification information for identifying the delivery machine 1.

The control unit 17 includes at least one CPU (Central Processing Unit), a ROM (Read Only Memory), a RAM (Random Access Memory), and the like, and executes various controls according to a program stored in the ROM (alternatively, the storage unit 16). For example, the control unit 17 performs control (travel control) to move the delivery machine 1 toward a delivery destination. In such control, the number of rotations of the wheels W and the position and traveling direction of the delivery machine 1 are controlled using the position information acquired from the positioning unit 12, the sensing information acquired from the sensor unit 14, delivery destination information, a delivery schedule, and the like to be described later. As a result, the delivery machine 1 can autonomously move toward the delivery destination. Incidentally, while the delivery machine 1 is traveling, the machine ID and the position information of the delivery machine 1 are sequentially transmitted to the information processing server 2 via the communication unit 13.

Here, the delivery destination information and the delivery schedule may be transmitted from the information processing server 2 to the delivery machine 1 together with an order ID, and set in the control unit 17. The order ID is identification information for identifying the order. An article ID for identifying an article may be used instead of the order ID. The delivery destination information includes, for example, the address of the delivery destination and position information of a receiving point of the article, and such position information may be expressed by latitude and longitude. The receiving point may be artificially determined, or may be mechanically determined from map data including the delivery destination. In a case where an article is delivered to each of a plurality of delivery destinations, delivery destination information is set for each delivery destination.

When the delivery machine 1 arrives at the delivery destination (receiving point), the control unit 17 transmits the machine ID and the arrival information of the delivery machine 1 to the information processing server 2 via the communication unit 13. The arrival time may include an arrival time of the delivery machine 1. Then, the control unit 17 performs control for transferring to the recipient (having the recipient receive) the article. For example, when the recipient inputs input data for unlocking the opening/closing door (that is, the opening/closing door is unlocked) of the storing chamber B from the display of the operation/display unit 15, the control unit 17 acquires the input data. Such input data may be code data including numbers and symbols, or may be biometric data such as fingerprints of the recipient. Incidentally, in a case where short-range wireless communication is performed between the user terminal 3 of the recipient and the delivery machine 1, input data input from the user terminal 3 by the recipient may be acquired by the control unit 17 via the communication unit 13.

When the input data input by the recipient is authenticated, the control unit 17 unlocks the opening/closing door of the storing chamber B in which the article is stored to open the opening/closing door, so that the article or the storage box H can be taken out. Here, the case where the input data is authenticated is, for example, a case where the input data matches preset authentication data. The authentication data used to check the input data is preferably set by being transmitted from the information processing server 2 to the delivery machine 1 together with the order ID and the like. However, in a case where there is no risk of theft or the like in the transfer (for example, if the delivery destination is in a specific company), the authentication of the input data is unnecessary, and thus, the authentication data may not be set.

Moreover, in a case where the receipt of the article by the recipient is detected, the control unit 17 transmits the machine ID and article receipt information of the delivery machine 1 to the information processing server 2 via the communication unit 13. The article receipt information may include a receipt time of the article. Here, the receipt of the article by the recipient may be detected by image analysis based on image data acquired by the optical sensor, or may be detected by weight reduction based on weight data acquired by a weight sensor installed in the storing chamber B. Alternatively, the receipt of the article by the recipient may be detected when the opening/closing door of the storing chamber B is unlocked or opened.

[1-2. Configuration and Function of Information Processing Server 2]

Figure 3A:
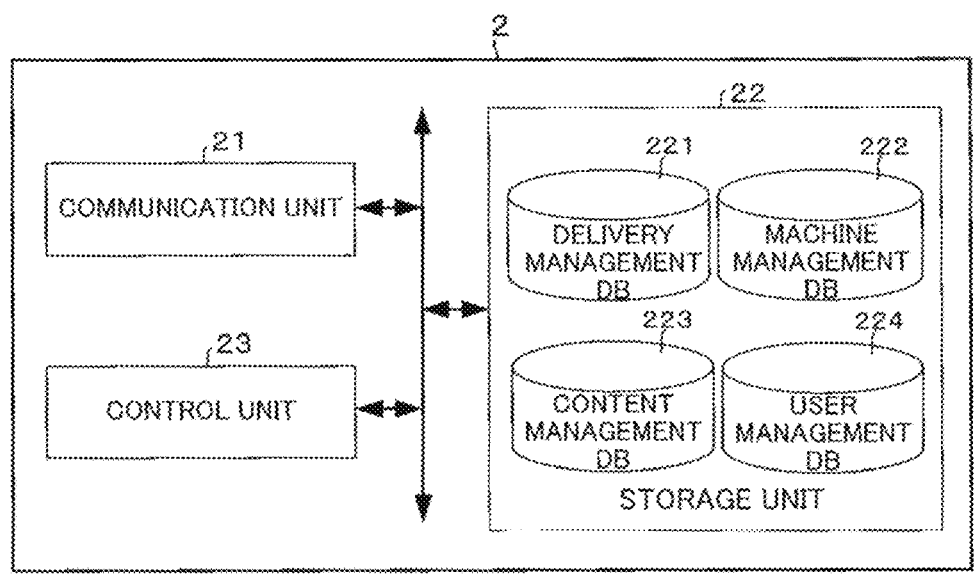
FIG. 3A is a diagram illustrating a schematic configuration example of an information processing server 2.

Next, a configuration and a function of the information processing server 2 will be described with reference to FIGS. 3A and 3B. The information processing server 2 is one or more server computers. Incidentally, the information processing server 2 constitutes an information providing site that provides information related to delivery (including the above content), and can cooperate with the EC site and the home delivery site. FIG. 3A is a diagram illustrating a schematic configuration example of the information processing server 2. As illustrated in FIG. 3A, the information processing server 2 includes a communication unit 21, a storage unit 22, a control unit 23, and the like. The communication unit 21 controls communication performed via the communication network NW. The machine ID and the position information transmitted from the delivery machine 1 are received by the communication unit 21. As a result, the information processing server 2 can recognize the current position of the delivery machine 1. Moreover, the machine ID and the arrival information transmitted from the delivery machine 1 are received by the communication unit 21. As a result, the information processing server 2 can recognize that the delivery machine 1 has arrived at the delivery destination. However, the arrival of the delivery machine 1 at the delivery destination can be determined from the current position of the delivery machine 1 and the delivery destination information. Moreover, the machine ID and the article receipt information transmitted from the delivery machine 1 are received by the communication unit 21. As a result, the information processing server 2 can recognize that the article has been received by the recipient.

The storage unit 22 includes, for example, a hard disk drive or the like, and stores various programs and data. The storage unit 22 includes map image data that can be provided to the user terminal 3. Moreover, in the storage unit 22, a delivery management database (DB) 221, a machine management database (DB) 222, a content management database (DB) 223, a user management database (DB) 224, and the like are constructed. Incidentally, these databases 221 to 224 may be configured by one database. Moreover, these databases 221 to 224 may be constructed in a database server other than the information processing server 2.

The delivery management database 221 is a database for managing information related to delivery of an ordered article. In the delivery management database 221, an order ID, an order confirmation date and time, an article ID of an article included in the order, a name of the article (for example, an item name), delivery destination information, a scheduled arrival time, a delivery status (delivery state), recipient information, the machine ID of the delivery machine 1 that delivers the article, and the like are stored (registered) in association with each order (delivery destination). Here, the scheduled arrival time is a scheduled time (date and time) at which the delivery machine 1 arrives at the delivery destination, and is calculated on the basis of a scheduled delivery start time, the distance from a delivery base to the delivery destination, and the average moving speed of the delivery machine 1. The delivery status changes, for example, in the order of "reception completed", "delivery preparation in progress" (delivery preparation), "delivery in progress", and "arrived". The recipient information includes, for example, a user ID of the recipient, a mail address of the recipient, or a telephone number. Moreover, the recipient information may include an AID for identifying a content output application installed in the user terminal 3.

The machine management database 222 is a database for managing information related to the delivery machine 1. In the machine management database 222, the machine ID of the delivery machine 1, the delivery schedule assigned to the delivery machine 1, and the like are stored in association with each delivery machine 1. Here, the delivery schedule includes a delivery timetable and a delivery route. The delivery timetable includes, for example, a scheduled delivery start time, a scheduled arrival time at each of the plurality of delivery destinations, and a scheduled return time to the delivery base. The delivery route is a route through each of the plurality of delivery destinations.

The content management database 223 is a database for managing content that can be output to the user terminal 3 during the delivery waiting time. In the content management database 223, a content ID, a content size (data amount), a content type, a content reproduction time (in the case of a moving image), and a content file are stored in association with each other for each content. Here, the content ID is identification information for identifying content. Examples of the content type (category) include electronic book, music, moving image (video), and game. Such types may be further hierarchically classified. Examples of a lower hierarchical type (sub-category) of the electronic book include magazine, comic, fiction, book, paperback book, and pocket-sized book. Among electronic books, a paperback book has a larger size than a magazine, and it takes time for a user to read all pages. Moreover, examples of a lower hierarchy of the moving image include movie, news, and the like.

The content of the electronic book is content (hereinafter referred to as "electronic book content") that is displayed and output on the user terminal 3 and can be read by the user while feeding pages on the user terminal 3. The content of the music is content (hereinafter referred to as "music content") that is audio-output on the user terminal 3 and can be listened to by the user. The content of the moving image is content (hereinafter referred to as "moving image content") that is displayed and audio-output on the user terminal 3 and can be viewed by the user on the user terminal 3. The content of the game is content (hereinafter referred to as "game content") that is displayed and audio-output on the user terminal 3 and can be played (for example, a character or the like is operated) by the user on the user terminal 3.

The content file includes data constituting content. The data constituting the content varies depending on the type of the content. For example, the data constituting the electronic book content mainly includes text data and still image data. The data constituting the music content mainly includes audio data. The data constituting the moving image content mainly includes text data, moving image data, and audio data. The data constituting the game content mainly includes text data, moving image data, audio data, and an in-game command code group.

The user management database 224 is a database for managing information related to a user whose account as a use member of the delivery service has been created. In the user management database 224, a user ID, a name, a mail address, and a telephone number are stored in association with each user. Here, the user ID is identification information for identifying the user. Moreover, in the user management database 224, benefit information indicating a benefit granted to the user may be stored in association with the user ID. Such a benefit may be, for example, an authority (for example, a right to view or the like content continuously for a predetermined period) to permit the output of the content after the output of the content is stopped on the user terminal 3. Alternatively, the benefit may be a discount coupon (in other words, a discount ticket) that can be used for payment at the time of purchase of the content after output of the content is stopped on the user terminal 3. Alternatively, the benefit may be a discount coupon or a point that can be used for payment of an item (including an item other than the above content) that can be purchased on an EC site. Incidentally, in a case where the content output application is installed in the user terminal 3, the AID of the output application is stored in the user management database 224 in association with the user ID.

The control unit 23 includes at least one CPU, a ROM, a RAM, and the like, and executes various processes according to the program (program code) stored in the ROM or the storage unit 22. The CPU (an example of processor) is configured to access the program code stored in the storage unit 22 or the memory and operate as instructed by the program code. The program code includes: specifying code configured to cause the CPU to specify content (the content is outputtable on the user terminal 3 during the delivery waiting time) according to the delivery waiting time until the delivery machine 1 arrives at the delivery destination of the article; and providing code configured to cause the CPU to provide the specified content to the user terminal 3 during the delivery waiting time. The program code may include presenting code configured to cause the CPU to present the recipient of the article with a delivery route and a current position of the delivery machine 1 with a delivery status of the article being delivery in progress. The program code may include first determining code configured to cause the CPU to determine whether or not a time from arrival of the delivery machine 1 to receipt of the article by the recipient is a threshold or less; and granting code configured to cause the CPU to grant a benefit to the recipient in a case where it is determined that the time is the threshold or less. The program code may include second determining code configured to cause the CPU to determine whether or not the specified content is being output on the user terminal 3. Then, in a case where it is determined that the specified content is being output on the terminal, the granting code causes the CPU to grant the recipient a benefit of higher value than in a case where the specified content is not being output on the user terminal 3.

Figure 3B:
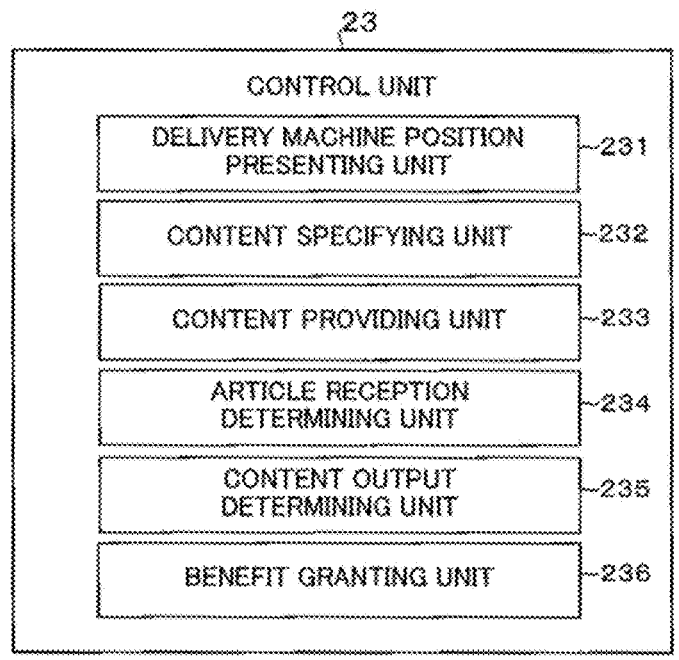
FIG. 3B is a diagram illustrating an example of functional blocks in a control unit 23.

FIG. 3B is a diagram illustrating an example of functional blocks in the control unit 23. As illustrated in FIG. 3B, the control unit 23 functions as a delivery machine position presenting unit 231, a content specifying unit 232, a content providing unit 233, an article reception determining unit 234, a content output determining unit 235, a benefit granting unit 236, and the like in accordance with the program code stored in, for example, the storage unit 22 or the memory.

Figure 4:
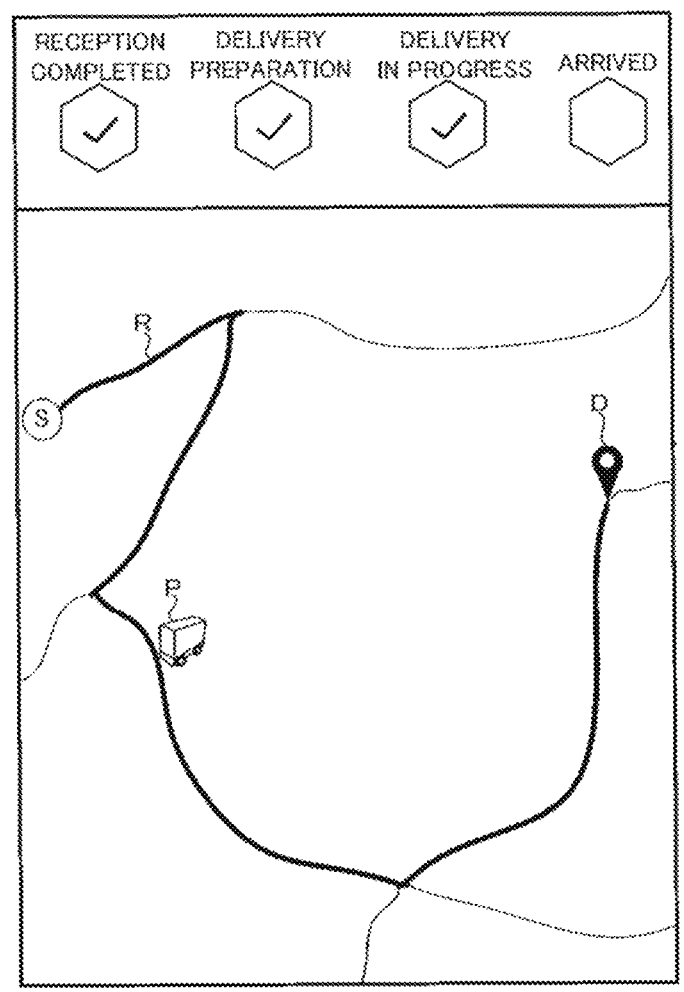
FIG. 4 is a diagram illustrating an example of a map image displayed on a user terminal 3.

The delivery machine position presenting unit 231 presents the recipient with the current position of the delivery machine 1 whose delivery status of the article is delivery in progress. For example, in response to a request from the user terminal 3 of the recipient (or another terminal of the recipient), the delivery machine position presenting unit 231 provides the user terminal 3, via the communication unit 21, with a map image (map image data) indicating a delivery route and a current position of the delivery machine 1 whose delivery status of the article to be received by the recipient is delivery in progress, and causes the user terminal 3 to display the map image. FIG. 4 is a diagram illustrating an example of a map image displayed on the user terminal 3. On the map image illustrated in FIG. 4, a delivery route R (bold line) and a current position (symbol indicating UGV) P of the delivery machine 1, and a delivery destination D are displayed. Here, the display position of the current position P of the delivery machine 1 changes according to the movement of the delivery machine 1. As a result, the recipient of the article can confirm on his/her terminal how far the delivery machine 1 that delivers the ordered article has come and where the delivery machine 1 is stopped. Incidentally, on the delivery route R, a delivery destination of another user other than the delivery destination of the recipient is also present but is not displayed.

The content specifying unit 232 specifies (in other words, identifies), from the content management database 223, content according to the delivery waiting time until the delivery machine 1 arrives at the delivery destination of the article and that can be output on the user terminal 3 during the delivery waiting time (in other words, the output is disabled on the user terminal 3 after the delivery waiting time elapses). Here, the delivery waiting time is, for example, a time from any time point (for example, an order confirmation time, a reception completion time, a delivery preparation start time, or a scheduled delivery start time) between the delivery determination of the ordered article and the start of delivery, to a scheduled arrival time at which the delivery machine 1 that delivers the article arrives at the delivery destination. In a case where the delivery waiting time is a time from a scheduled delivery start time to a scheduled arrival time, it can be referred to as delivery time (that is, the time required for delivery).

Moreover, the content that can be output on the user terminal 3 during the delivery waiting time (in other words, the output is disabled on the user terminal 3 after the delivery waiting time elapses) means that the output is stopped in accordance with the time when the delivery machine 1 arrives at the delivery destination (that is, the content output is controlled to stop) or the content ends. Here, "the content ends" means, for example, that the reproduction of the music content or the moving image content ends, or that the browsing of an electronic book ends. Moreover, the "time when the delivery machine 1 arrives at the delivery destination" is not limited to the time point (time) when the delivery machine 1 arrives at the delivery destination, and may include immediately before the delivery machine 1 arrives at the delivery destination (for example, 10 m before the delivery destination or 1 minute before arrival at the delivery destination) or after a predetermined time (for example, 1 minute) elapses since the delivery machine 1 arrives at the delivery destination. Incidentally, the content output stop control may be performed on the information processing server 2 side or may be performed on the user terminal 3 side. In a case where the output stop control is performed on the user terminal 3 side, data indicating an output stop time (for example, a scheduled arrival time) is preferably included in the content file.

The content specifying unit 232 may specify content having a size (content size), a type (content type), or a reproduction time (content reproduction time) according to the delivery waiting time. For example, content having a larger size is specified as the delivery waiting time is longer. That is, the size of the content specified when the delivery waiting time is longer than a threshold is greater than the size of the content specified when the delivery waiting time is shorter than the threshold. Alternatively, content having a longer reproduction time is specified as the delivery waiting time is longer. That is, the reproduction time of the content specified when the delivery waiting time is longer than a threshold is longer than the reproduction time of the content specified when the delivery waiting time is shorter than the threshold. At this time, it is preferable to specify content to be ended according to the time when the delivery machine 1 arrives at the delivery destination. As a result, it is possible to suppress dissatisfaction or the like of the recipient waiting for the arrival of the article due to the delivery waiting time. Alternatively, moving image content having a reproduction time longer than the delivery waiting time may be specified. In this case, by performing the content output stop control in accordance with the time when the delivery machine 1 arrives at the delivery destination, it is possible to satisfy that the content can be output on the user terminal 3 during the delivery waiting time.

Moreover, for the content of the type according to the delivery waiting time, for example, a table that defines a correspondence relationship between the delivery waiting time and the content type may be used. FIG. 5 is a diagram illustrating an example of a table that defines a correspondence relationship between the delivery waiting time and the content type. In the example of FIG. 5, the type "Electronic book—Magazine" is associated with the delivery waiting time "less than 20 minutes", the type "Electronic book—Comic" is associated with the delivery waiting time "20 minutes or more and less than 40 minutes", the type "Electronic book—Book or Novel" is associated with the delivery waiting time "40 minutes or more and less than 60 minutes", and the type "Moving image" is associated with the delivery waiting time "60 minutes or more". Incidentally, time ranges may be divided in stages for the delivery waiting time of 60 minutes or more (for example, 60 minutes or more and less than 80 minutes, 80 minutes or more and less than 100 minutes, and 100 minutes or more), and a content ID of moving image content having a reproduction time according to each time range may be associated with the time range. For example, the content ID of the moving image content whose reproduction time is 85 minutes is associated with the delivery waiting time range "60 minutes or more and less than 80 minutes".

The content providing unit 233 provides the content specified by the content specifying unit 232 to the user terminal 3 via the communication unit 21 during the delivery waiting time. Thus, by making the recipient interested in the content that can be output while waiting for the arrival of the article, the possibility that the recipient does not do other business as much as possible is increased, and thus, it is possible to make the recipient easily aware of the arrival of the delivery machine 1, so that the article can be smoothly received. As a result, the time until the recipient receives the article can be shortened, and a decrease in delivery efficiency can be suppressed. In particular, during the delivery waiting time, when the delivery status of the article is delivery in progress, the content may be provided to the user terminal 3. That is, the content can be output when the delivery status is delivery in progress. As a result, in a case where the recipient feels dissatisfied when viewing the map image presented by the delivery machine position presenting unit 231, such as a case where there is a plurality of delivery destinations and the delivery machine 1 is stopped at a delivery destination of another user for a long time, it is possible to alleviate the dissatisfaction by providing the content.

In a case where the content output stop control is performed on the information processing server 2 side, the content providing unit 233 preferably starts streaming distribution of the content to the user terminal 3 during the delivery waiting time, and stops the streaming distribution in accordance with the time when the delivery machine 1 arrives at the delivery destination. Alternatively, after providing the content to the user terminal 3 via the communication unit 21, the content providing unit 233 may transmit, to the user terminal 3, control data for stopping the output of the content in accordance with the time when the delivery machine 1 arrives at the delivery destination. Alternatively, the content providing unit 233 may transmit, to the user terminal 3, control data (including data indicating an output stop time) for stopping the output in accordance with the time when the delivery machine 1 arrives at the delivery destination, together with the content.

Moreover, the content providing unit 233 may provide the user terminal 3 with arrival notification information (that is, information indicating notification that the delivery machine 1 has arrived) output from the user terminal 3 in accordance with the time when the delivery machine 1 arrives at the delivery destination. Here, the arrival notification information is output so as to overlap with the output of the content immediately before the output of the content is stopped or the content ends (for example, a few seconds before). This makes it easy for the recipient to recognize the notification that the delivery machine 1 has arrived, thereby making it easier for the recipient to notice the arrival of the delivery machine 1. Incidentally, the arrival notification information preferably includes information indicating that a benefit is granted to the recipient in a case where the time from the arrival of the delivery machine 1 to the receipt of the article by the recipient is shorter than a threshold.

Figure 6:
FIG. 6 is a diagram illustrating an example of arrival notification information displayed so as to overlap with a display of a content.

FIG. 6 is a diagram illustrating an example of the arrival notification information displayed so as to overlap with the display of the content. In the example of FIG. 6, "The package has arrived. Please come to receive it." is displayed over content C as arrival notification information M. Furthermore, in the example of FIG. 6, in the arrival notification information, "If you receive the package within x minutes from the arrival of the package, a discount coupon that can be used at the time of purchase of viewed content will be granted." is displayed as information indicating that the benefit is granted to the recipient in a case where the time from the arrival of the delivery machine 1 to the receipt of the article by the recipient is short. Here, x minutes is set to, for example, about 3 to 5 minutes. As a result, it is possible to give the recipient an incentive such as being able to view or browse the continuation of the content, and thus, it is possible to promote the receipt of the article by the recipient. As a result, the time until the recipient receives the article can further be shortened, and a decrease in delivery efficiency of the article can be suppressed.

The article reception determining unit 234 calculates a time (receiving time) from the arrival of the delivery machine 1 to the receipt of the article by the recipient, and determines whether or not the calculated time is a threshold (for example, x minutes) or less. Here, the arrival (arrival time) of the delivery machine 1 may be specified by, for example, the arrival information received by the communication unit 21. The receipt (receipt time) of the article by the recipient may be specified by the article receipt information received by the communication unit 21. The content output determining unit 235 determines whether or not the content provided by the content providing unit 233 is output (is being output) on the user terminal 3. Incidentally, whether or not the content is output on the user terminal 3 may be determined on the basis of content output information transmitted from the user terminal 3.

In a case where the article reception determining unit 234 determines that the time to the receipt of the article by the recipient is the threshold or less, the benefit granting unit 236 grants a benefit to the recipient. This can promote the receipt of the article by the recipient. As a result, the time until the recipient receives the article can further be shortened, and a decrease in delivery efficiency can be suppressed. Incidentally, granting of a benefit means, for example, that benefit information indicating the benefit is stored in the user management database 224 in association with the user ID. Moreover, in a case where the content output determining unit 235 determines that the content is output on the user terminal 3, the benefit granting unit 236 may grant the recipient a benefit of higher value than in a case where the content is not output on the user terminal 3. As a result, it is possible to promote active viewing, browsing, and the like of the content by the recipient. Incidentally, the value of high benefit corresponds to a discount coupon having a high discount rate or to a right to continuously view or the like content for a longer period of time.

[1-3. Configuration and Function of User Terminal 3]

Figure 7:
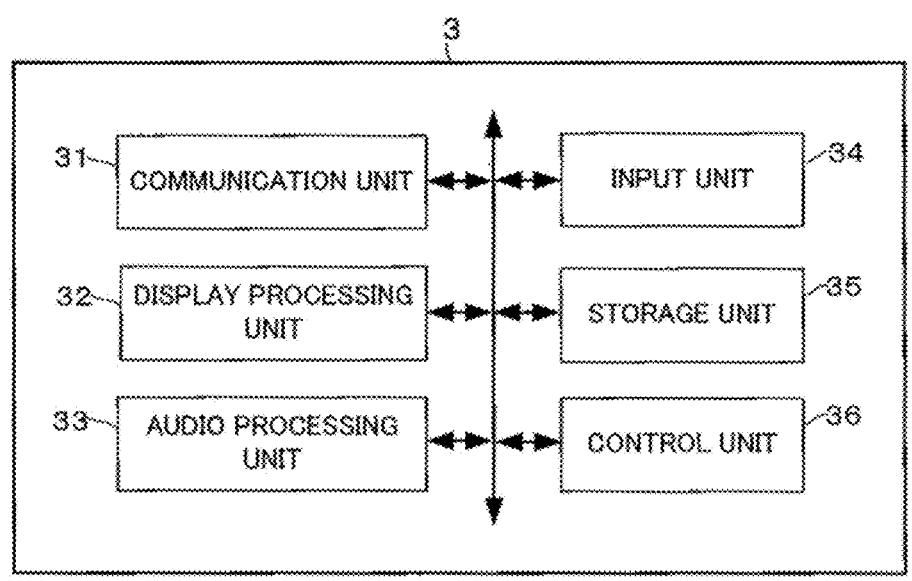
FIG. 7 is a block diagram illustrating a schematic configuration example of the user terminal 3.

Next, a configuration and a function of the user terminal 3 will be described with reference to FIG. 7. The user terminal 3 can access the information providing site, the EC site, and the home delivery site to which a specific URL (Uniform Resource Locator) is assigned on the communication network NW. As the user terminal 3, for example, a personal computer (PC), a smartphone, a tablet, a mobile phone, a portable game machine, or the like can be applied. FIG. 7 is a block diagram illustrating a schematic configuration example of the user terminal 3. The user terminal 3 includes a communication unit 31, a display processing unit 32, an audio processing unit 33, an input unit 34, a storage unit 35, a control unit 36, and the like. The communication unit 31 has a function of connecting to the communication network NW. The display processing unit 32 has a function of displaying and outputting content (text data, still image data, moving image data, etc.) provided from the information processing server 2 and the map image on a display (not illustrated). The audio processing unit 33 has a function of audio-outputting content (audio data) provided from the information processing server 2 from a speaker (not illustrated).

The input unit 34 has a function of receiving an operation (for example, an operation in which an operation button on the screen is clicked or tapped by a mouse, a finger, or the like) by the user (recipient). Such an operation includes an operation for starting or stopping the output of the content provided from the information processing server 2, and an operation for requesting the information processing server 2 for a map image on which a delivery route and a current position of the delivery machine 1 that is in delivery are displayed. The storage unit 35 stores programs such as an operating system (OS) and a web browser. Moreover, the storage unit 35 may store a content output application. The content output application may be stored in a non-transitory computer readable memory. The content output application causes the control unit 36 (an example of a computer) to function to cause the user terminal 3 to output content during the delivery waiting time until the delivery machine 1 that delivers the article arrives at the delivery destination, and to stop the output in accordance with the time when the delivery machine 1 arrives at the delivery destination. Such output stop control is performed according to the above-described data indicating the output stop time (for example, the scheduled arrival time).

The control unit 36 includes at least one CPU, a ROM, a RAM, and the like, and executes various processes according to a program stored in the storage unit 35 or the non-transitory computer readable memory. For example, the control unit 36 performs processing for causing the display processing unit 32 and the audio processing unit 33 to output content using a web browser or the content output application, the content (the specified content) having been provided from the information processing server 2 and received by the communication unit 31. Such processing includes decoding processing such as decompression and decoding of data included in the content received by the communication unit 31. Incidentally, in a case where the content is distributed by streaming from the information processing server 2, a buffer memory for buffering the content received by the communication unit 31 is created in the RAM of the control unit 36. Moreover, in response to an operation by the user, the control unit 36 requests the information processing server 2 for a map image on which a delivery route and a current position of the delivery machine 1 that is in delivery are displayed. Then, the control unit 36 performs processing for causing the display processing unit 32 to output the map image provided by the delivery machine position presenting unit 231 in response to the request and received by the communication unit 31. Incidentally, while the content provided from the information processing server 2 is output on the user terminal 3, the control unit 36 may transmit the content output information to the information processing server 2 via the communication unit 31 at predetermined time intervals.

[2. Operation of Delivery System S]

Figure 8:
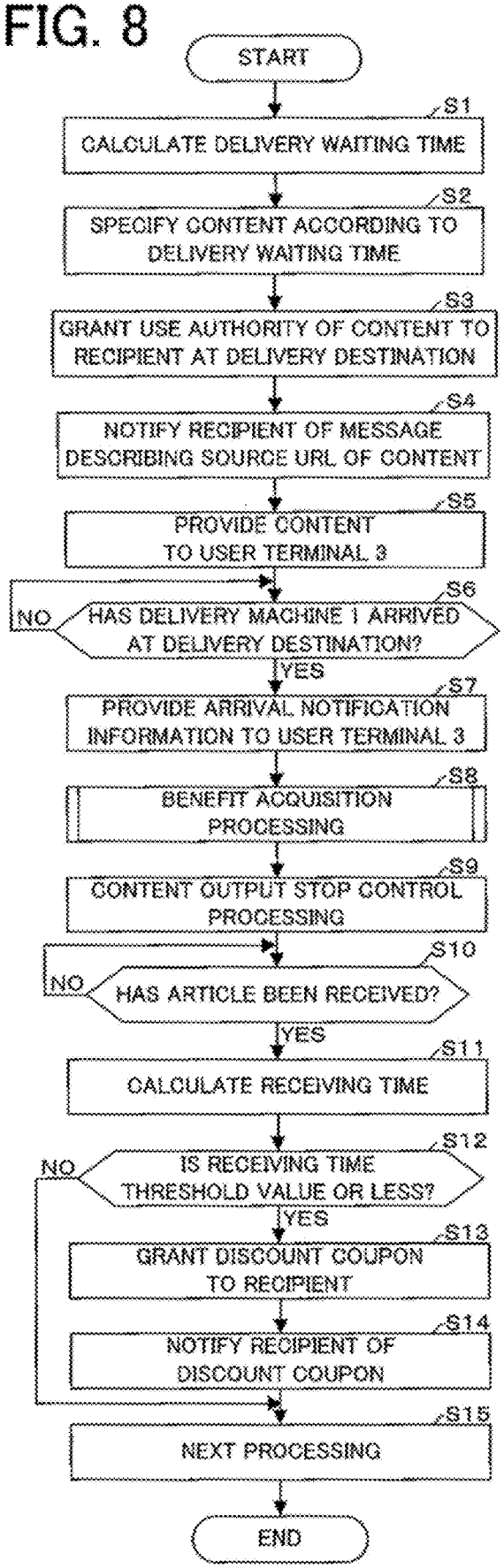
FIG. 8 is a flowchart illustrating an example of processing executed by the control unit 23 of the information processing server 2.

Next, an operation example of the delivery system S will be described with reference to FIG. 8 and other drawings. FIG. 8 is a flowchart illustrating an example of processing executed by the control unit 23 of the information processing server 2. Incidentally, as a premise of the following operation example, it is assumed that an order ID, delivery destination information, and a delivery schedule are provided from the information processing server 2 to the delivery machine 1 to which the delivery schedule is assigned.

The processing illustrated in FIG. 8 is started when the delivery machine 1 that loads the article related to the order starts delivery from the delivery base according to the delivery schedule. When the processing illustrated in FIG. 8 is started, the control unit 23 acquires, from the delivery management database 221, information (for example, delivery destination information, a scheduled arrival time, a delivery status, recipient information, and the like) associated with the order ID corresponding to the first delivery destination, and calculates the delivery waiting time until the delivery machine 1 arrives at the delivery destination of the article on the basis of, for example, the scheduled arrival time at the delivery destination of the delivery machine 1 (step S1).

Next, the control unit 23 causes the content specifying unit 232 to specify the content according to the delivery waiting time calculated in step S1 from the content management database 223 (step S2). For example, in a case of specifying content of a size, a type, or a reproduction time according to the delivery waiting time, the content specifying unit 232 determines whether or not the delivery waiting time is y minutes (for example, 30 minutes) or more. Then, in a case where it is determined that the delivery waiting time is not y minutes or more, the content specifying unit 232 specifies the electronic book content. At this time, together with the electronic book content or instead of the electronic book content, the moving image content whose reproduction time is the delivery waiting time or less may be specified.

On the other hand, in a case where it is determined that the delivery waiting time is y minutes or more, the content specifying unit 232 specifies the game content. At this time, together with the game content or instead of the game content, the moving image content whose reproduction time is the delivery waiting time or more may be specified. Incidentally, the content specifying unit 232 may specify a type of content according to the delivery waiting time using the table illustrated in FIG. 5. Incidentally, in step S3, a plurality of pieces of content may be specified.

Next, the control unit 23 grants a use authority (output authority) of the content specified in step S2 to the recipient at the delivery destination (step S3). By such granting, for example, use authority information indicating the use authority of the content is stored in the user management database 224 in association with the user ID of the recipient. Next, the control unit 23 notifies the recipient to whom the use authority is granted in step S3 of a message describing the source URL of the content (for example, the URL of the information providing site) specified in step S2 (step S4). Incidentally, the notification of the message may be performed by transmitting an e-mail describing the message to the mail address of the recipient, or may be performed by transmitting the message to a phone number of the recipient by SMS. Alternatively, the notification of the message may be performed by push distribution of the message to the content output application resident in the user terminal 3 of the recipient.

Then, when the recipient acquires the message by the user terminal 3 and selects the URL described in the message, a content list page provided from the information providing site by accessing the information providing site from the user terminal 3 is displayed on the user terminal 3. In the content list page, information (for example, a content name or the like) of one or more pieces of content specified in step S2 is displayed in a selectable manner. For example, a URL associated with each content is set in the information. Then, when the recipient selects desired content on the content list page, the user terminal 3 transmits a provision request of the selected content to the information processing server 2 via the communication unit 31.

Next, in response to the provision request from the user terminal 3, the control unit 23 causes the content providing unit 233 to provide the content specified in step S2 to the user terminal 3 via the communication unit 21 (step S5). Here, the content providing unit 233 may determine whether or not the delivery status of the delivery machine 1 is delivery in progress in response to the provision request from the user terminal 3, and provide the content specified in step S2 to the user terminal 3 in a case where the delivery status is determined to be delivery in progress (that is, after waiting until the delivery status changes to delivery in progress).

Incidentally, in a case where the content is provided by streaming distribution, in step S5, the content providing unit 233 starts streaming distribution of the content to the user terminal 3. As a result, the user terminal 3 outputs the streaming-distributed content while buffering the content. On the other hand, in a case where the content is not provided by streaming distribution, the content specified in step S2 is transmitted (downloaded) to the user terminal 3. As a result, the user terminal 3 outputs the content according to the operation by the recipient after the download of the content is completed.

Next, the control unit 23 determines whether or not the delivery machine 1 has arrived at the delivery destination (step S6). This determination is repeated until the delivery machine 1 arrives at the delivery destination. For example, in a case where the machine ID and the arrival information transmitted from the delivery machine 1 are received by the communication unit 21, the control unit 23 determines that the delivery machine 1 has arrived at the delivery destination (step S6: YES), and the processing proceeds to step S7. Alternatively, in a case where the current position of the delivery machine 1 has reached the position indicated in the delivery destination information, the control unit 23 may determine that the delivery machine 1 has arrived at the delivery destination (step S6: YES), and the processing may proceed to step S7. Incidentally, in step S6, it may be determined whether or not the timing immediately before the delivery machine 1 arrives at the delivery destination (for example, 10 m before the delivery destination or 1 minute before arrival at the delivery destination) or the timing after a lapse of a predetermined time (for example, 1 minute) from the arrival of the delivery machine 1 at the delivery destination has come, and in a case where the timing has come, the processing may proceed to step S7.

In step S7, the control unit 23 causes the content providing unit 233 to provide the arrival notification information to the user terminal 3 via the communication unit 21. As a result, the user terminal 3 outputs (for example, display-output or audio-output) the received arrival notification information so as to overlap with the output of the content. As described above, the arrival notification information preferably includes information indicating that a discount coupon that can be used at the time of purchase of the content is granted upon receipt within x minutes from the arrival of the package.

Figure 9:
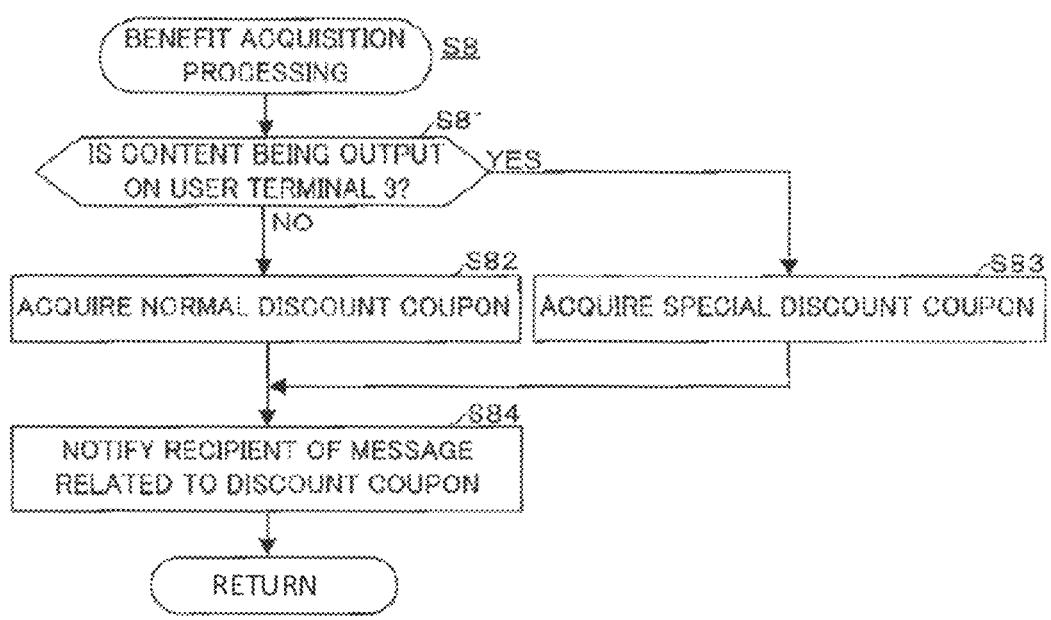
FIG. 9 is a diagram illustrating an example of the benefit acquisition processing in step S8 illustrated in FIG. 8.

Next, the control unit 23 executes benefit acquisition processing (step S8). FIG. 9 is a diagram illustrating an example of the benefit acquisition processing in step S8 illustrated in FIG. 8. In the benefit acquisition processing illustrated in FIG. 9, the control unit 23 causes the content output determining unit 235 to determine whether or not the content provided in step S5 is being output on the user terminal 3 (step S81). In a case where the content is being distributed by streaming, it is determined that the content is being output on the user terminal 3. Alternatively, in a case where the content output information is received from the user terminal 3, it is determined that the content is being output on the user terminal 3.

In a case where it is determined in step S81 that the content is not being output on the user terminal 3 (step S81: NO), the control unit 23 acquires a normal discount coupon of the content being output on the user terminal 3 (step S82). On the other hand, in a case where it is determined in step S81 that the content is being output on the user terminal 3 (step S81: YES), the control unit 23 acquires a special discount coupon of the content being output on the user terminal 3 (step S83). The special discount coupon is, for example, a discount coupon having a higher discount rate than a normal discount coupon.

Next, the control unit 23 notifies the recipient to whom the use authority has been granted in step S3 of the message related to the discount coupon (step S84). The message describes, for example, information indicating that a discount coupon that can be used at the time of purchase of the content is granted upon receipt within x minutes from the arrival of the package. In a case where such information is included in the arrival notification information, the message related to the discount coupon may not be notified to the recipient. Incidentally, notification of the message is performed by a method similar to that in step S4.

Returning to the processing of FIG. 8, in a case where the content is being output on the user terminal 3, the control unit 23 executes content output stop control processing (step S9). For example, in a case where the content is under streaming distribution, the control unit 23 stops the streaming distribution of the content by the output stop control processing. On the other hand, in a case where the content is downloaded, the control unit 23 transmits, to the user terminal 3, control data for stopping the output of the content by the output stop control processing. As a result, the output of the content is stopped on the user terminal 3. Incidentally, in a case where the content output stop control is performed on the user terminal 3 side, or in a case where the content ends during the delivery waiting time, the processing of step S9 is not performed, and the processing proceeds to step S10.

In step S10, the control unit 23 causes the article reception determining unit 234 to determine whether the article has been received from the delivery machine 1 by the recipient. For example, in a case where the machine ID and the article receipt information transmitted from the delivery machine 1 have been received by the communication unit 21, the control unit 23 determines that the article has been received from the delivery machine 1 by the recipient (step S10: YES), and the processing proceeds to step S11. On the other hand, in a case where the control unit 23 determines that the article has not been received from the delivery machine 1 by the recipient (step S10: NO), the processing returns to step S10.

In step S11, the control unit 23 calculates the receiving time from the arrival time of the delivery machine 1 to the article receipt time by the recipient. Next, the control unit 23 causes the article reception determining unit 234 to determine whether or not the receiving time calculated in step S11 is a threshold (for example, x minutes) or less (step S12). In a case where it is determined that the receiving time is the threshold or less (step S12: YES), the processing proceeds to step S13. In a case where it is determined that the receiving time is not the threshold or less (step S12: NO), the processing proceeds to step S15.

In step S13, the control unit 23 causes the benefit granting unit 236 to grant the discount coupon acquired in step S8 to the recipient to whom the use authority is granted in step S3. Next, the control unit 23 notifies the recipient to whom the discount coupon has been granted in step S13 of the discount coupon acquired in step S8 (step S14), and the processing proceeds to step S15. Incidentally, the notification of the discount coupon may be performed by transmitting an e-mail describing the source URL of the discount coupon to the mail address of the recipient, or may be performed by transmitting a message describing the source URL of the discount coupon to the telephone number of the recipient by SMS. Alternatively, the notification of the discount coupon may be performed by push distribution of the message to the content output application resident in the user terminal 3. In the next processing of step S15, the control unit 23 acquires the information associated with the order ID corresponding to the next delivery destination, returns to step S1, and continues the similar processing, or in a case where the article delivery to all the delivery destinations is completed by the delivery machine 1, the processing illustrated in FIG. 8 ends.

As described above, according to the above embodiment, the information processing server 2 communicates with the user terminal 3 of the recipient of the article delivered by the delivery machine 1, specifies content that is content according to the delivery waiting time until the delivery machine 1 arrives at the delivery destination of the article and that can be output on the user terminal 3 during the delivery waiting time, and provides the specified content to the user terminal 3 during the delivery waiting time. Thus, by making the recipient interested in the content that can be output while waiting for the arrival of the article, the possibility that the recipient does not do other business as much as possible is increased, and thus, it is possible to make the recipient easily aware of the arrival of the delivery machine 1. This enables smooth reception of the article. As a result, the time until the recipient receives the article can be shortened, and a decrease in delivery efficiency can be suppressed.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the UGV is illustrated as an example of the delivery machine, but the present invention can also be applied to, for example, a case where a UAV (Unmanned Aerial Vehicle) is a delivery machine such as a drone or a multi-copter capable of autonomously flying in the air, or a case where a vehicle operated by a delivery person is a delivery machine.

REFERENCE SIGNS LIST

1 Delivery machine
2 Information processing server
3 User Terminal
11 Drive unit
12 Positioning unit
13 Communication unit
14 Sensor unit
15 Operation/display unit
16 Storage unit
17 Control unit
21 Communication unit
22 Storage unit
23 Control unit
231 Delivery machine position presenting unit
232 Content specifying unit
233 Content providing unit
234 Article reception determining unit
235 Content output determining unit
236 Benefit granting unit
31 Communication unit
32 Display processing unit
33 Audio processing unit
34 Input unit
35 Storage unit
36 Control unit
NW Communication network
S Delivery system

What is claimed is:

1. An information processing device configured to communicate over a communication network with a terminal being used by a recipient of an article as well as with an unmanned delivery machine that transmits its current location over the network while delivering the article to the recipient; the information processing device comprising:
at least one memory configured to store program code including specifying code, providing code and rewarding code; and
at least one computer hardware processor configured to access the program code and operate as instructed by the program code, the program code including:
the specifying code configured to cause the at least one processor of the information processing device to specify recipient-waiting content according to a delivery waiting time until the unmanned delivery machine arrives at a delivery destination of the article, the specifying code causing the processor to specify, based on the delivery waiting time, the recipient-waiting content to be either a magazine content, a game content, a comic book content, a novel content, or a moving image content, the recipient-waiting content being associated with a source universal resource locator (source URL), and the processor selecting, directly proportional to the delivery waiting time, the recipient-waiting content to be either (1) longer content when the delivery waiting time is greater than a threshold amount of time, or (2) shorter content when the delivery waiting time is less than the threshold amount of time, the longer content having a greater time duration of output on the terminal than the shorter content;
the providing code configured to cause the at least one processor of the information processing device to:
receive, over the communication network and from the terminal of the recipient, a provision request for the terminal to receive the recipient-waiting content;
stream, in response to the provision request and within the delivery waiting time, the recipient-waiting content from the source URL, over the communication network and to the terminal of the recipient, the streaming occurring while the unmanned delivery machine operates to deliver the article to the recipient;

determine, based on the current location of the unmanned delivery machine, arrival of the unmanned delivery machine at the delivery destination;

display, on the terminal of the recipient and in response to the arrival, an arrival notification over the recipient-waiting content being streamed on the terminal, the arrival notification including (1) a request for the recipient to retrieve the article from the unmanned delivery machine as well as (2) a notice of a reward conditioned upon the article being retrieved from the unmanned delivery machine within a predetermined amount of time, and the notice presenting the predetermined amount of time on the terminal via the arrival notification; and transmit, in response to the arrival, control data to the terminal, the control data stopping the terminal from streaming the recipient-waiting content before retrieval of the article from the unmanned delivery machine; and the rewarding code configured to cause the at least one processor of the information processing device to, after the streaming has stopped, (1) detect the retrieval of the article at a retrieval time; and (2) grant the reward to the recipient conditioned on the retrieval time being within the predetermined amount of time that was presented to the recipient via the arrival notification.

2. The information processing device of claim 1, the program code further including presenting code configured to cause the at least one processor to present the recipient of the article with a delivery route and a delivery status of the article, the status being delivery in progress.

3. The information processing device of claim 1, the program code further configured to cause the at least one processor to determine whether or not the recipient-waiting content is being output on the terminal, wherein
in a case where it is determined that the recipient-waiting content is being output on the terminal, the rewarding code causing the at least one processor to grant the recipient a benefit of higher value than in a case where the recipient-waiting content is not being output on the terminal.

4. The information processing device of claim 1, wherein the reward is an authority to permit the terminal to continue output of the recipient-waiting content after the streaming of the recipient-waiting content is stopped on the terminal via the control data.

5. The information processing device of claim 1, wherein the reward is a discount coupon usable at a time of purchase of the recipient-waiting content after the streaming of the recipient-waiting content is stopped on the terminal via the control data.

6. The information processing device of claim 1, wherein the recipient-waiting content is the game content, and the game content is playable by the recipient on the terminal.

7. The information processing device of claim 1, wherein the recipient-waiting content is the moving image content, and the moving image content is viewable as a video by the recipient on the terminal.

8. The information processing device of claim 1, the providing code further configured to cause the at least one processor of the information processing device to:

display, on the terminal of the recipient, a map image and the current location of the unmanned delivery machine on the map image; and grant, to the recipient, a use authority of the recipient-waiting content.

9. A method of communicating over a communication network with a terminal being used by a recipient of an article as well as with an unmanned delivery machine that transmits its current location over the network while delivering the article to the recipient, the method comprising:

specifying recipient-waiting content according to a delivery waiting time until the unmanned delivery machine arrives at a delivery destination of the article by specifying, based on the delivery waiting time, the recipient-waiting content to be either a magazine content, a game content, a comic book content, a novel content, or a moving image content, the recipient-waiting content being associated with a source universal resource locator (source URL), selecting, directly proportional to the delivery waiting time, the recipient-waiting content to be either (1) longer content when the delivery waiting time is greater than a threshold amount of time, or (2) shorter content when the delivery waiting time is less than the threshold amount of time, the longer content having a greater time duration of output on the terminal than the shorter content;

receiving, over the communication network and from the terminal of the recipient, a provision request for the terminal to receive the recipient-waiting content;

streaming, in response to the provision request and within the delivery waiting time, the recipient-waiting content from the source URL, over the communication network and to the terminal of the recipient, the streaming occurring while the unmanned delivery machine operates to deliver the article to the recipient;

determining, based on the current location of the unmanned delivery machine, arrival of the unmanned delivery machine at the delivery destination;

displaying on the terminal of the recipient and in response to the arrival, an arrival notification over the recipient-waiting content being streamed on the terminal, the arrival notification including (1) a request for the recipient to retrieve the article from the unmanned delivery machine as well as (2) a notice of a reward conditioned upon the article being retrieved from the unmanned delivery machine within a predetermined amount of time, and the notice presenting the predetermined amount of time on the terminal via the arrival notification; and transmitting, in response to the arrival, control data to the terminal, the control data stopping the terminal from streaming the recipient-waiting content before retrieval of the article from the unmanned delivery machine; and after the streaming has stopped, (1) detecting the retrieval of the article at a retrieval time; and (2) granting the reward to the recipient conditioned on the retrieval time being within the predetermined amount of time that was presented to the recipient via the arrival notification.

* * * * *